United States Patent [19]

Wilson et al.

[11] Patent Number: 4,999,720
[45] Date of Patent: Mar. 12, 1991

[54] ZONE DENSITY SECTOR COUNTER

[75] Inventors: Rosser S. Wilson, Menlo Park; Frank Seuberling, Fremont, both of Calif.

[73] Assignee: Maxtor Corporation, San Jose, Calif.

[21] Appl. No.: 361,550

[22] Filed: Jun. 5, 1989

[51] Int. Cl.$^5$ .................................................. G11B 5/09
[52] U.S. Cl. ......................................... 360/48; 360/40
[58] Field of Search ...................... 360/48, 51, 78, 50, 360/40

[56] References Cited

U.S. PATENT DOCUMENTS

4,674,071 6/1987 Okumura et al. .................. 360/48
4,858,034 8/1989 Hassel et al. ...................... 360/51

Primary Examiner—Vincent P. Canney
Attorney, Agent, or Firm—Hecker & Harriman

[57] ABSTRACT

In the present invention, a single sector counter and accompanying multiple buffer registers are used to provide the sector count for a plurality of recording zones. Initially, the sector counter is validated by synchronizing it with an index mark. In one embodiment, an angular position sensing counter counts a clock having a frequency and phase to match the occurrence of segments in a reference zone. A look up table or computation provides an offset value representing the difference between each reference zone segment boundary, and the occurrence of the next consecutive sector in each of the recording zones. Additional logic generates periodic sector pulses once the zone transition has been accomplished, and provides means to prevent generation of shortened sector intervals. This permits rapid validation of the sector signal so that it is no longer necessary to wait for the index in a hard-sectored drive before establishing the sector position when changing zones. This improves the latency of the disk drive and overall system performance.

14 Claims, 7 Drawing Sheets

Seqence of Sector Length change in The First Embodiment

ZONE DENSITY SECTOR COUNTER

BACKGROUND OF THE PRESENT INVENTION

1. Field of the Invention

The invention relates to the field of mass storage devices.

2. Background Art

In a typical rotating media mass storage system, data is stored on magnetic or magneto optic disks in a series of concentric "tracks." These tracks are accessed by a read/write head which detects variations in a magnetic orientation of the disk's surface. These variations represent information stored on the disk surface.

The tracks are electronically divided into a plurality of smaller fields, or physical records, or "sectors." Because storage disks are used as random access memory in many applications, such as personal computers, related information is not always written consecutively in the individual tracks. In addition, as old data is removed and new data added, it is not always possible to write new data in adjacent sectors or even adjacent tracks. Therefore, it is important for the disk drive to be able to quickly and accurately locate individual sectors of a track.

One measure of disk drive performance is "rotational latency," the average time it takes a data head to access a given sector, once the head is positioned on a track. In disk drives, rotational latency is defined as one-half of a disk rotation since, on the average, a desired record is 180 degrees from the initial position of the data head. It is desirable to minimize rotational latency.

The reference point for an angular position of the head with respect to the particular track being accessed is provided by an "index" which defines a starting location for each track. The index point is typically determined by decoding fiducial data written as part of the servo information used for control of data head positioning. Before data in a sector can be accessed, an electronic signal must be produced to indicate that the sector sought is under the read/write head. The production of this signal can be accomplished in two ways.

Figure 6:
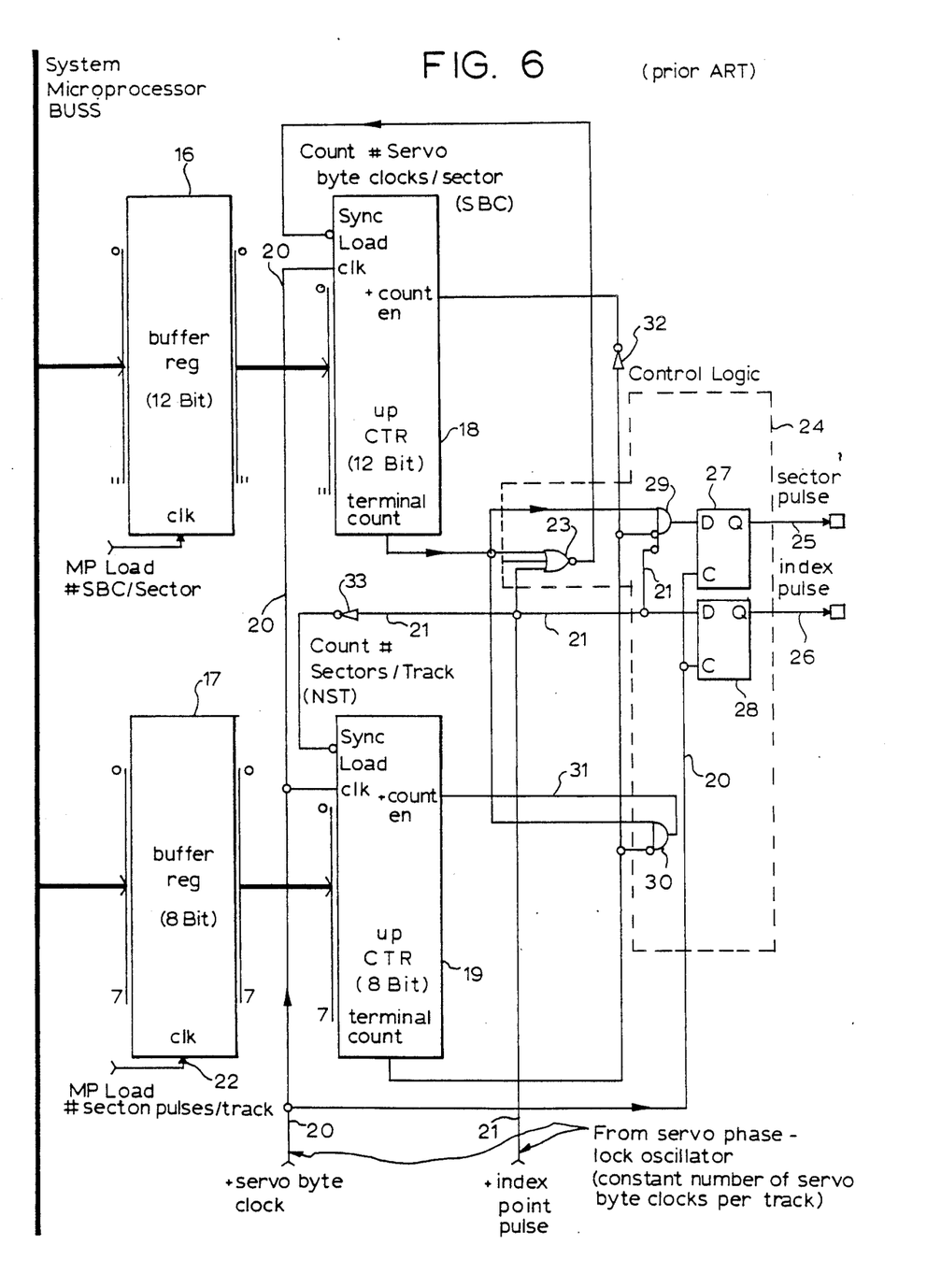
FIG. 6 shows a prior art sector counter.

One prior art solution to the problem of sector location is to provide a single sector counter which continuously monitors sector position. The sector counter method can be utilized in a fixed sector-length format, where each physical record on the disk is of equal length. In this scheme, a counter is periodically initialized by the index mark, and is stepped by a clock which is synchronized in phase and frequency with the disk rotation rate. This clock and the index mark are conventionally generated in the phase-lock oscillator (PLO) of the servo system. Each increment of the counter defines a new sector. This is referred to as a "hard" sector counter scheme. FIG. 6 illustrates this prior art.

A disadvantage of direct application of the prior art hard sector counter occurs when the sector length is variable from track to track, such as in a constant density recording scheme. In constant density recording schemes, the disk is divided into a plurality of concentric "zones." The write frequency is different for each zone so that the bit/inch density is approximately constant for the entire disk. When the write frequency is highest, there are a greater number of sectors per track. When the read/write head is moved from zone to zone, the sector counter must be reset for the new zone parameters by waiting for the occurrence of the index point. Hence, the latency time increases when the prior art sector counter scheme is utilized in a constant density recording scheme. Thus, application of the prior art hard sector method is not suitable for use in a practicable, constant density recording scheme.

A second prior art method to provide accurate sector location information is known as a "soft" sector scheme. In a soft sector method, sector boundaries are identified by means of "address marks" formed as part of the sector. The address mark is such that it will not be mistaken for data, such as a void of 3 bytes, or a violation of run-length properties of the chosen recording code. The soft sector method has the well-known disadvantage of susceptibility to noise and media defects. In addition, the soft sector scheme takes up disk space otherwise available for data recording. The noise problem affects the reliability of the soft sector scheme. A soft sector scheme requires no sector counter; sector identification is provided by detection of an address mark by special hardware provided for that purpose.

Because of the disadvantages of the soft sector scheme, it is desirable to utilize a hard sectoring scheme in a zoned-density recording format. However, there is a time penalty when using the prior art sector counter method since it requires revalidation at index of the sector count when moving from zone to zone. One solution is to provide a separate dedicated prior art sector counter for each zone and to switch to the appropriate counter when changing zones. However, this adds to the complexity and cost of the hardware implementation, and is impractical when a large number of zones is required.

Therefore, it is an object of the present invention to provide an economical hard sector counting scheme applicable to zoned-density format.

It is another object of the present invention to provide a sector counting scheme which may be implemented using a single sector counter.

It is yet another object of the present invention to provide a sector counter for use in zoned-density recording system which does not increase latency.

SUMMARY OF THE PRESENT INVENTION

In the present invention, a single sector counter is used to provide the sector count for a plurality of recording zones. Initially, the sector counter is validated by synchronizing it with an index mark. In one embodiment, an angular position counter (APC) counts at a master sector count having a frequency to match the occurence of sectors in a reference zone. A look up table or computational algorithm provides an offset value representing the difference between each APC count, and the occurrence of the next consecutive sector in each of the recording zones. This permits rapid validation of the sector signal so that it is no longer necessary to wait for the index before establishing the sector position when changing zones. This improves the latency of the disk drive and overall system performance.

The sector-counting channel of the present invention includes a positional reference counter coupled to a byte clock and to the index signal. The reference counter outputs a count corresponding to the angular position of the disk. When the read/write head moves from one zone to another, a number related to the offset between the current angular position and the next-occurring sector boundary in the target zone is loaded into an offset latch. The contents of the offset latch are coupled in turn to a second, sector length counter which provides a first sector pulse in the new zone when the proper offset after the reference count has occurred. Once the first sector pulse in the new zone has been delivered, the normal sector length value for sectors in that zone is loaded into the counter from a second latch at each sector time thereafter.

Thus, while the read/write heads remain in that zone, the sector length counter is controlled by the sector length of that particular zone. The process is repeated when another zone change occurs. Auxiliary circuits are included to ensure that no truncated sectors are generated in the zone. By use of this method, sector pulses are made available almost immediately in the new zone, without necessity to await occurrence of index. All operations associated with sector count changeover can be overlapped with mechanical positioning time.

DETAILED DESCRIPTION OF THE PRESENT INVENTION

A sector counter for providing rapid change in sector length in a hard-sectored, multiple recording zone format is described. In the following description, numerous specific details, such as number of zones, number of sectors, etc., are set forth to provide a more thorough description of the present invention. It will be apparent, however, to one skilled in the art, that the present invention may be practiced without these specific details. In other instances, well known features have not been described in detail so as not to obscure the present invention.

PRIOR ART SECTOR COUNTER DESCRIPTION

An example of a prior art sector counter is illustrated in FIG. 6. A buffer register 16 is coupled to a microprocessor bus. The associated microprocessor would typically be engaged in servo control functions in the disk drive. The microprocessor loads the number of counts per sector of a servo byte clock into the register. The output of the buffer register 16 holds the count (2's complement) of the number of servo byte clock cycles per sector. The output of buffer register 16 is coupled to (SBC) counter 18. A servo byte clock 20 clocks counter 18 and counter 19. The terminal count output of counter 18 is coupled to NOR gate 23 and to an input of AND gate 29. Counter 18 counts the number of servo byte clocks per sector. When counter 18 overflows, NOR gate 23 causes counter 18 to be synchronously reloaded with the count stored in register 16. A pulse on the index point line 21 also causes loading of counter 18 from register 16.

Buffer register 17 is also coupled to the microprocessor bus. The buffer register 17 holds the count (2's complement) of the number of sectors per track. The purpose of buffer register 17 and associated counter 19 is to suppress potential short sectors which can occur at the end of the track when the number of sectors per track times the number of servo byte clocks per sector does not equal the number of servo byte clocks per track. NST counter 19 counts the number of sectors per track and is coupled to the output of buffer register 17.

The terminal count output of counter 19 is coupled to AND gate 30, AND gate 29 and through inverter 32 to the count enable of counter 18. Index point pulse 21 is coupled to NOR gate 23, AND gate 29, the D input of flipflop 28 and through inverter 33 to the synchronous load input of counter 19. The output of NOR gate 23 is coupled to the synchronous load input of counter 18. The output of AND gate 29 is coupled to the D input of flipflop 27. Flipflops 27 and 28 synchronize sector pulse 25 and index pulse 26 outputs, respectively, in order to remove potential spikes caused by combinational logic decodes of flipflop outputs.

The output of AND gate 30 is coupled to the count enable terminal of counter 19. The portion of the circuit of FIG. 6 illustrated in dashed line 24 is the control logic, and suppresses sector pulses when the count in counter 19 overflows. The control logic 24 blocks further action in the entire sector counter until next index time occurs. Sector pulse output 25 and index pulse output 26 are directed to the system data controller, where they govern disk format timing.

FIRST EMBODIMENT

Figure 7:
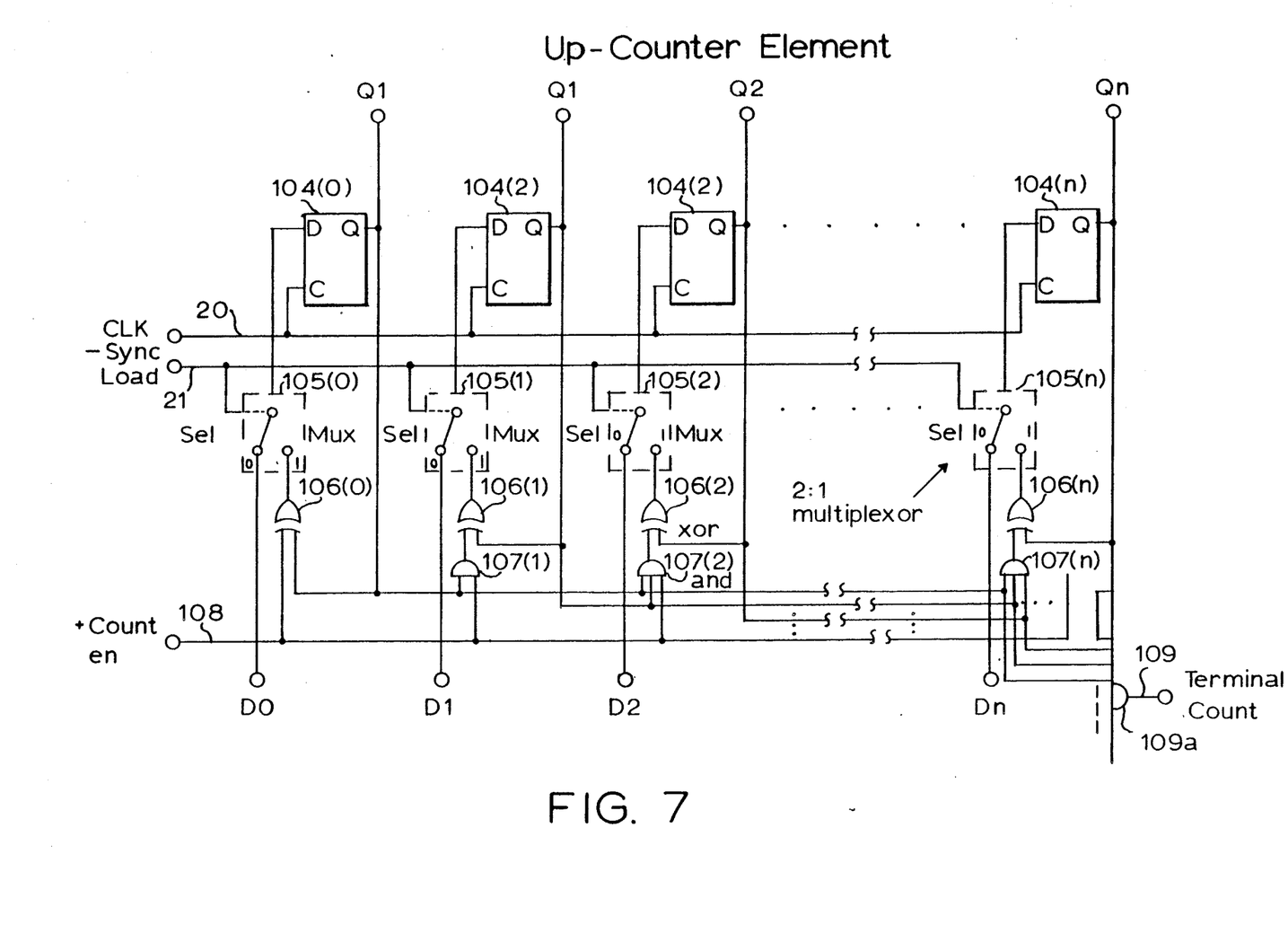
FIG. 7 shows an example implementation of the up counter employed in the present invention.

The present invention is utilized with a constant density recording scheme having a plurality of constant density recording zones, each zone having either a common or different data record length. The present invention minimizes latency when changing zones without adding complex hardware to the disk drive. It will also be recognized that the invention is applicable to a 'pseudo variable record length' scheme, in which all sectors on any specific track have a common length, but in which the sectors on adjacent tracks may be of unequal length. All counters in the ensuing descriptions are implemented as illustrated in FIG. 7. The FIG. 7 counter is an 'up' counter having synchronous load and count-enable inputs.

Figure 1:
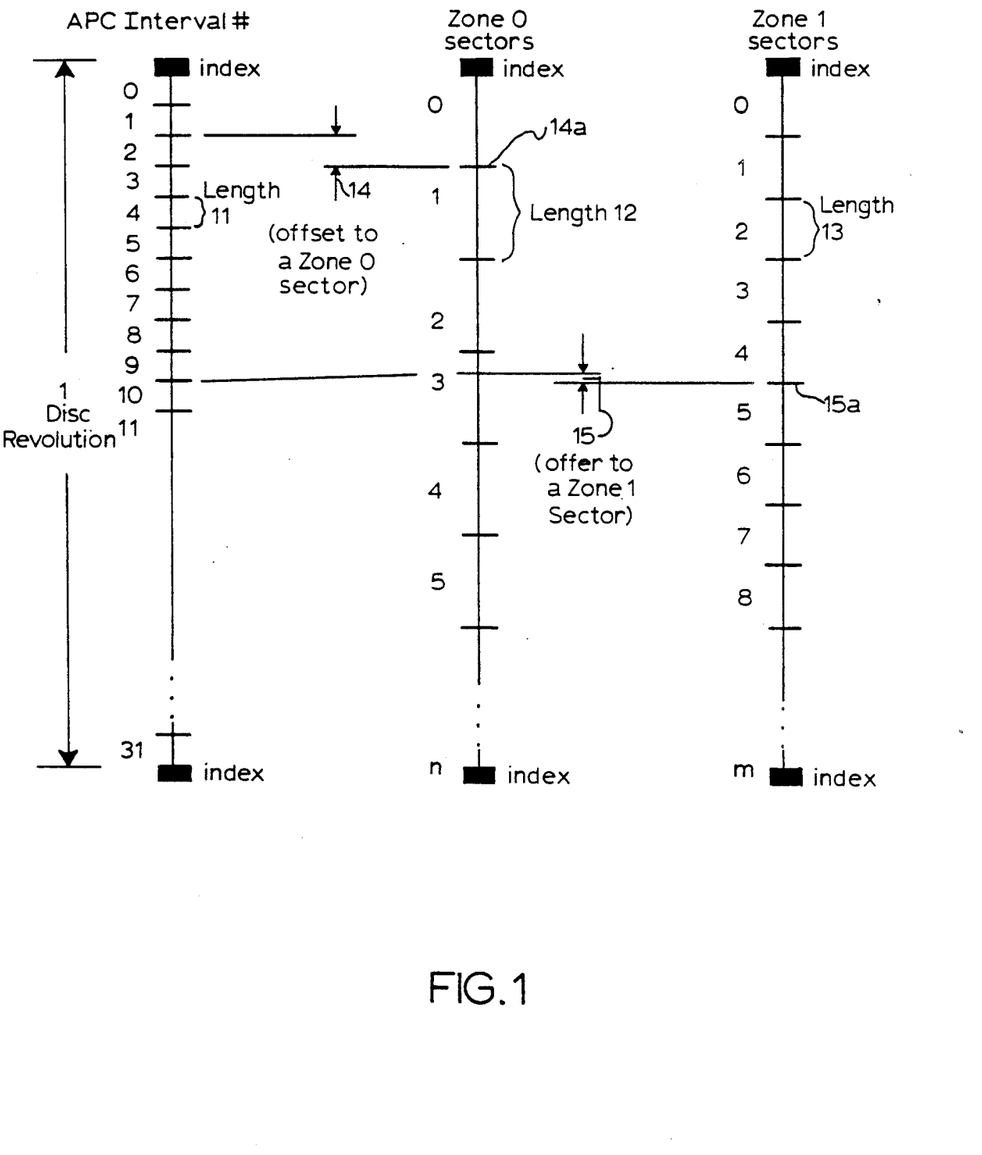
FIG. 1 illustrates the sector lengths for a two-zone recording system.

An example of sector counts for two different recording zones is illustrated in FIG. 1. Although only two different recording zones are illustrated in FIG. 1, it will be appreciated that any number of zones can be supported by use of the present invention. A reference APC counter divides all tracks into 32 equiangular APC intervals of which one is shown at interval 11. Note that APC interval 0 occurs just subsequent to index point. The APC counter can be examined by microcode at any time, and provides an orientation reference which is independent of zone. Although 32 APC intervals are utilized in the present invention, any suitable number may be utilized without departing from the scope of the present invention. The length 11 of each APC interval is constant for the entire track, and is independent of zone.

Zone 0 represents an inner zone of a recording disk formatted in zoned density format and includes sectors 0–n. The zone 0 sectors in this illustration have a length 12 greater than the length 11 of the APC intervals. Zone 1 represents an outer zone of a recording disk. In a constant density scheme, zone 1 has sectors 0-m where m is greater than n. Correspondingly, the length 13 of each zone 1 sector is less than the length 12 of a zone 0 sector. In the example of FIG. 1, the sector length 13 of zone 1 is greater than the length 11 of the APC intervals.

By way of example, when the head moves from a track in another zone to a track in zone 0, the sector count necessarily changes. If the last APC boundary crossed is the boundary lying between APC intervals 0 and 1, there is an offset 14 before the next consecutive sector (sector 1) of zone 0 is reached. This offset value is computed or obtained from a table lookup operation, and is provided to a sector counter to provide a valid sector count as soon as zone 0 is entered. If sector 1 of zone 0 is the desired sector, then sector pulse 14(a) can be generated, and its associated sector 1 may be written to or read from immediately without waiting for index to be encountered (a saving of up to one revolution).

If the head moved from zone 1, the sector length again changes. Assuming now that microcode reads the APC counter and determines the head to be in APC interval 9, then it can calculate the offset 15 to the next-occurring sector in zone 1 and supply this value to the sector counter of this invention so that sector pulse 15(a) can issue immediately. Similarly, the offset values between any APC interval and sectors in any zone can be computed as well.

In a first embodiment of the present invention, a single double-buffered sector counter is used to provide a sector count function serving a plurality of zones. The counter is comprised of two cascaded up-counting sections, one each of which counts the number of servo byte clocks per sector, and number of sectors per track. These counters will be hereafter referred to as the SBC and NST counters, respectively. The SBC counter is incremented by servo byte clock. The NST counter is incremented by overflow (all 1's) condition of the SBC counter. Associated with each counter is a set of first and second backing, or buffer, registers, and multiplexors to switch between these registers.

A further, independent counter provides an angular position sensing (APC) reference which divides one revolution of the disk into a constant number of equal-angle fiducial intervals. This counter can be polled by microcode at any time, and increments its count by one at APC boundary points. The counter is, periodically, initialized to zero at index time.

When the read/write head moves from one zone to another, the APC counter is interrogated and microcode calculates the number of servo byte clock intervals remaining between the next APC boundary, and the first sector pulse in the new zone which follows the next APC boundary. It also determines, relative to the next APC boundary, how many sector pulses must be delivered prior to index. These two numbers are loaded by microcode into the first buffer registers associated with the SBC and NST counters, respectively. Also loaded by microcode into the second buffer registers of the SBC and NST counters, respectively, are the normal counts for number of servo byte clocks per sector, and number of sector pulses per track in the new zone. At the next APC boundary, the contents of the first buffer registers are transferred under hardware control into their associated SBC and NST counters.

When the SBC counter reaches terminal count, and at all subsequent terminal count or index times, the SBC is automatically reloaded from its associated second backing register, and the NST counter is advanced by one count. A sector pulse is generated whenever the SBC counter reaches terminal count, provided the NST register has not attained terminal count.

In similar fashion, when index time occurs, and at all subsequent index times, the contents of the second backing register associated with the NST counter are transferred into the NST counter. When the NST counter reaches terminal count, it suppresses issuance of further sector pulses by the SBC counter, and can be incremented no further.

The above-described sequence is repeated whenever a zone change is made. Because zone changes entail a head-repositioning operation typically requiring two milliseconds in a high-performance machine, ample time is available for the required software operations. It can be seen that the role of the first backing registers is to store counts associated with sector pulse generation for that fragment of track lying between the zone change point and index point; once index point occurs, the second backing registers assume a role similar to that of the single NST and SBC counter buffer registers of the prior art sector counter method.

DESCRIPTION OF FIRST EMBODIMENT

Figure 2:
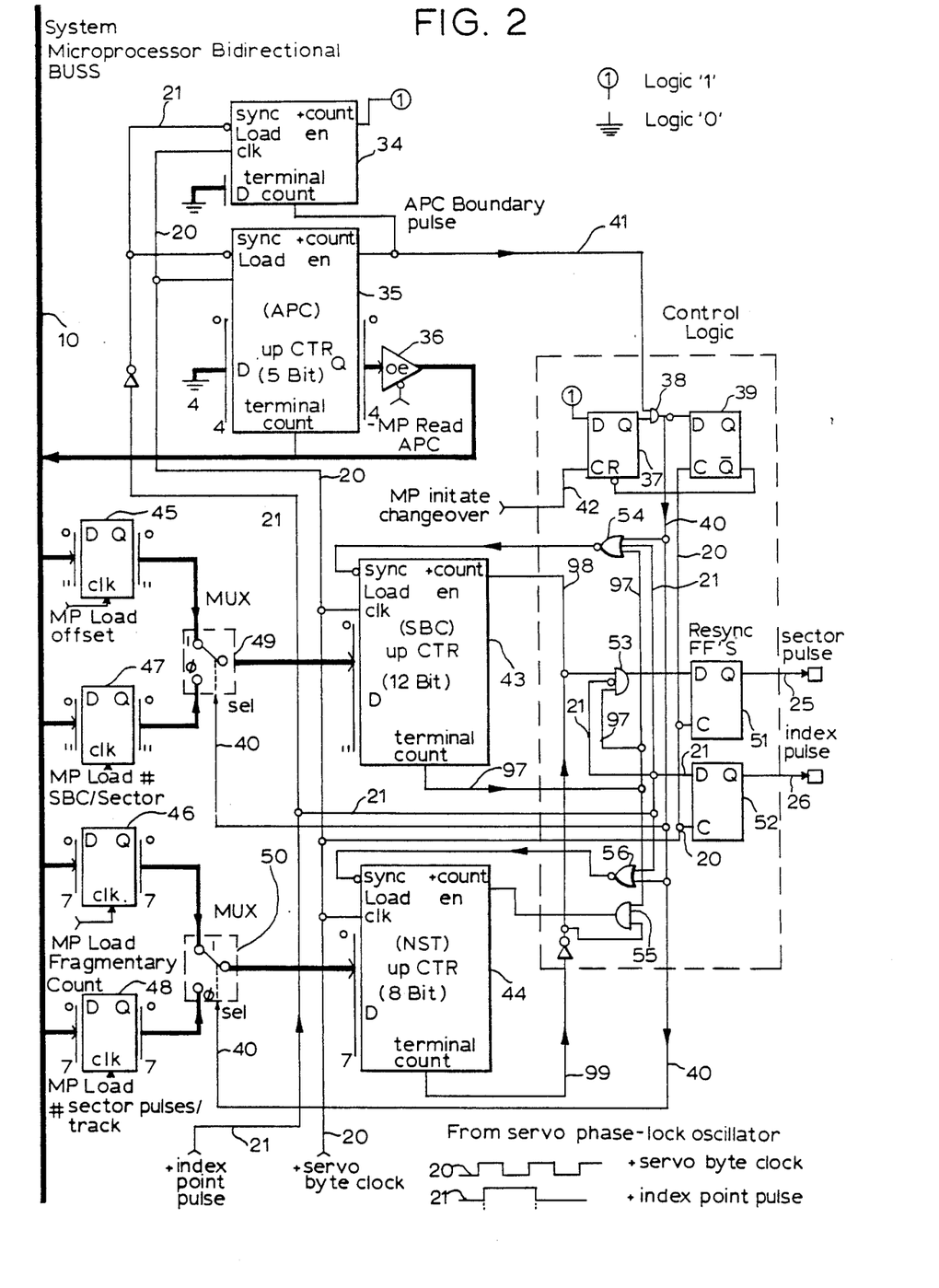
FIG. 2 is a block diagram illustrating the sector counting scheme of the first embodiment of the present invention.

FIG. 2 illustrates the preferred embodiment of the present invention. The circuitry of the sector counter of the present invention is coupled through a bus 10 to a system microprocessor (not shown). Servo channel circuitry (not shown) provides the servo byte clock 20 and index point pulse 21. The servo byte clock and index signals are decoded from servo information prerecorded on a servo disk, and are phase coherent with disk rotation. In a typical embodiment, 20,480 servo byte clock cycles issue per rotation of the disk.

The servo byte clock 20 and the index point pulse 21 are provided to prescaler 34. The prescaler 34 divides the servo byte clock by a value appropriate to yield 32 APC states per revolution. The prescaler 34 provides an APC boundary pulse 41 as output. Although 32 APC states are chosen for the preferred embodiment of the present invention, other numbers of APC counts can be chosen. The fewer the number of counts, the higher the latency at zone crossovers. The greater the number of counts, the less the latency; a point of diminishing returns of large numbers of APC states is reached, however, because of the finite mechanical motion time of the disk actuator.

APC counter 35 is also coupled to servo byte clock 20 and index point pulse 21 signals, respectively. The APC counter 35 is stepped by APC boundary pulses 41, and divides tracks into 32 equal intervals, regardless of which zone the track may be in. As with the prescaler, other numbers of counts can be chosen depending on performance requirements. The Q outputs of counter 35 are coupled to a tri-state gate 36. The output of tri-state gate 36 is coupled to the microprocessor bus 10 to permit the microprocessor to read the state of the counter 35.

SBC counter 43 counts number of servo byte clocks per sector, and is loaded from one of registers 45 and 47 through its D input terminal. When a zone change occurs, the microprocessor reads the state of APC counter 35 from the output of tri-state gate 36. The microprocessor then calculates or applies a lookup table to determine the offset between the next APC boundary point and the next thereafter sector boundary in the target zone. This offset value is loaded into register 45.

A number representing the servo byte clock per sector count for the target zone is loaded into register 47. Multiplexor 49 initially is coupled to register 45, providing the offset value to counter 43. The output 98 of counter 43 is coupled to AND gate 53. The terminal count output 98 of counter 43, and index point pulse 21, are also coupled as inputs to AND gate 53. The index pulse 21 is directed to a negative-true input of AND gate 53. Negative-true gate and counter inputs are signified by a dotted input, in accordance with conventions of the AVT. The output of AND gate 53 is coupled to flip flop 51. Flip flop 51 is clocked by the servo byte clock 20. Flipflop 51 provides the sector pulse output 25 representing a sector boundary.

The D input of NST counter 44 is coupled to one of registers 46 and 48. The NST counter counts the number of sectors per track. The microprocessor loads register 46 with the fragmentary count of number of sector pulses intervening between the next sector pulse, and index point. Register 48 is loaded by the microprocessor with a count of the number of sector pulses for the entire track. These load operations occur during a zone crossover sequence in microcode. The outputs of registers 46 and 48 are coupled to multiplexer 50. Multiplexer 50 selectively couples one of registers 46 and 48 to the input of counter 44. Initially, multiplexer 50 couples register 46 to counter 44. Counter 44 is clocked by servo byte clock 20. Counter 44 provides a terminal count output 99 which is inverted and coupled to an input of AND gate 53.

After being inverted, the terminal count 99 of counter 44 is coupled to an input of AND gate 55, along with the terminal count 97 of counter 43. The output of AND gate 55 is coupled to the count enable input terminal of counter 44.

Index pulse 21 is coupled to the D input of flipflop 52. Servo byte clock 20 is applied to the clock input of flipflop 52. The output 26 of flipflop 52 is the index pulse.

Flipflops 37 and 39 are used to generate a pulse 40 which occurs at the next APC boundary following a pulse on line 42, which is connected to the clock input of flipflop 37. The microprocessor generates a pulse on line 42 to cause flipflop 37 to set. This pulse is delivered after microcode has loaded registers 45, 46, 47 and 48. The pulse arms the logic to commence a zone changeover at the next APC boundary pulse time. The Q output of flipflop 37 is coupled to AND gate 38 along with the APC boundary pulse 41. The output of AND gate 38 is coupled to the D input of flipflop 39 over wire 40. The inverted Q output of flipflop 39 is coupled to the reset input of flipflop 37. The line 40 is coupled to an input of NOR gate 54, to an input of NOR gate 56, and also controls the multiplexers 49 and 50. When output 40 is pulsed, counters 43 and 44 are loaded from registers 45 and 46, respectively, and the zone changeover sequence commences.

Also coupled as inputs to NOR gate 54 are terminal count 97 of counter 43 and index pulse 21. The output of NOR gate 54 is coupled to the synchronous load input of counter 43. Output 40 and index pulse 21 are coupled as inputs to NOR gate 56. The output of NOR gate 56 is coupled to the synchronous load terminal of counter 44.

Counter 43 counts the number of servo byte clocks per sector and is implemented in the preferred embodiment as a 12-bit counter. The counter 43 receives its D input via the multiplexer 49 which selects one of registers 45 and 47. Register 45 holds the offset count from the next APC boundary, to the first subsequent sector pulse in the target zone. Register 47 holds a count of number of servo byte clocks per sector. Counter 43 counts only as long as the counter 44 is not in an overflow (all 1's) state.

Counter 44 counts the number of sector pulses to be issued prior to index. In this embodiment, counter 44 is implemented as an 8-bit up counter. The counter 44 can be loaded from either register 46 or register 48 through the multiplexer 50. Register 46 holds a count of the number of sector pulses to be issued between the next APC boundary, and the index. Register 48 holds a count of the number of sector pulses per track in the target zone. Counter 44 is used to prevent occurrences of possible short sectors at end of track.

The flipflops 51 and 52 synchronize the sector pulse and the index pulse. The outputs of these flipflops are applied to the disk drive data controller on wires 25 and 26. AND gate 53 is used to suppress potential sector pulses at index time, since conventionally index pulse demarks the onset of sector 0. It also suppresses the sector pulse when the counter 44 has reached its terminal count state, and continues this suppression operation until the next index point pulse time.

The NOR gate 54 is used to initiate synchronous load of counter 43 from its D inputs at the following times:
(1) Terminal count of counter 43;
(2) Index point;
(3) Next APC boundary point occurring after wire 42 is pulse.

NOR gate 56 permits preload of counter 44 from its D input terminal at either index point, or when line 40 pulses at the next APC boundary after line 42 is pulsed by the microprocessor, to initiate a zone change.

AND gate 55 allows counter 44 to advance one stage for each terminal count of counter 43. In this way, counter 44 counts sector pulses per track. Overflow of counter 44 blocks further counting of counters 43 and 44.

ZONE CHANGE FIG. 2

Figure 3:
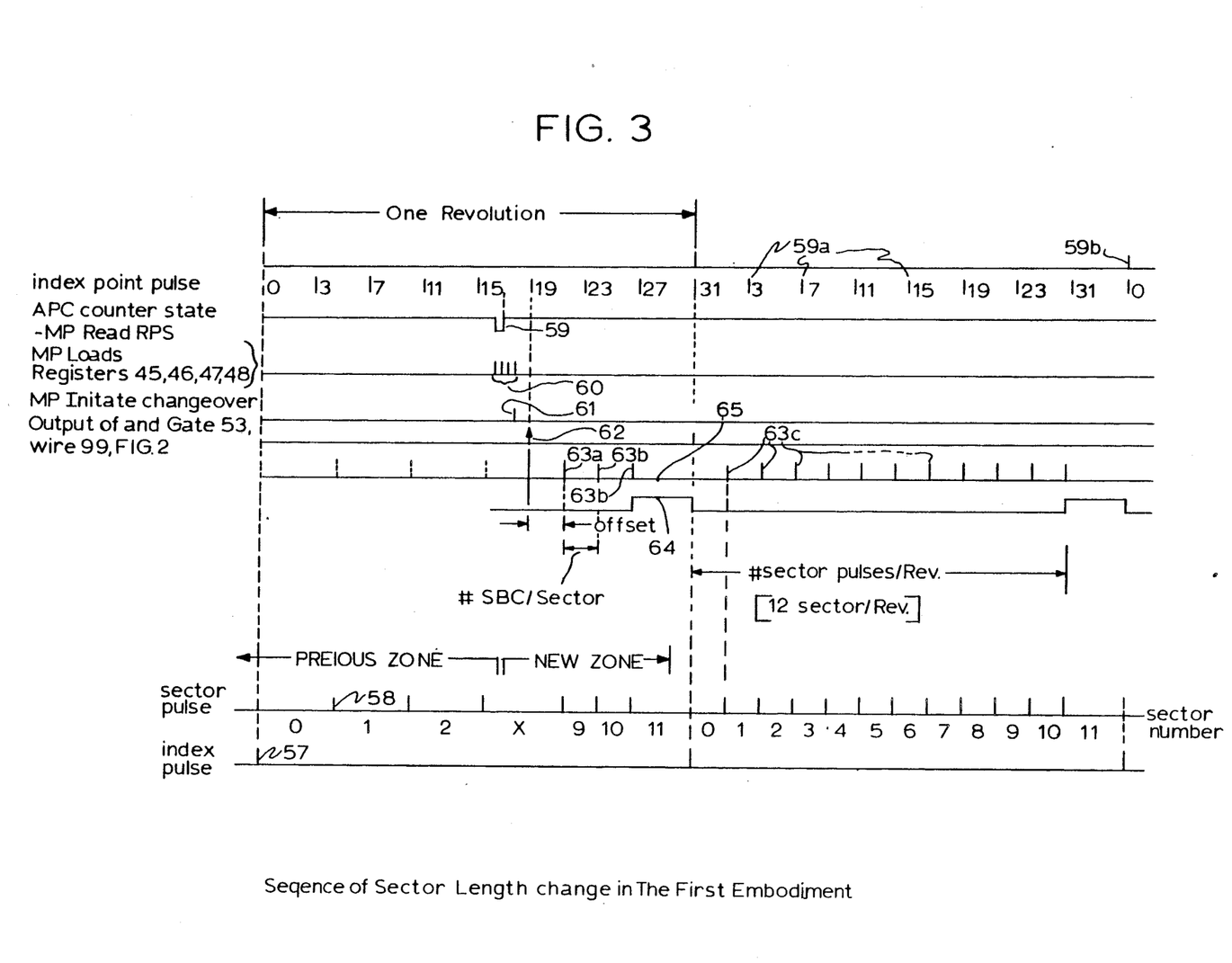
FIG. 3 shows the sequencing of a sector-length change in the first embodiment of the invention.

The waveforms of signals appearing in FIG. 2 are illustrated in FIG. 3. In the following description of zone change, refer to FIGS. 2 and 3.

Operation in previous zone delivers index pulses 57 and sector pulses 58. When a zone change is to be made, the microprocessor reads APC register at time 59, calculates or looks up appropriate parameters and loads them into their respective buffer registers 45, 46, 47, and 48 at time points 60. After the load is accomplished, the 'MP Initiate Changeover' line (42 in FIG. 2) is pulsed at time 61; this causes pulse 62 to issue on output 40 on FIG. 2. Pulse 62 is issued coincident with the next APC boundary pulse on line 41 of FIG. 2. APC boundary pulses are denoted by number 59(a) and index point pulses by 59(b) in FIG. 3.

As a result, counter 43 loaded with the offset value from register 45, whereupon it times out the prescribed interval, and delivers the first sector pulse of the new zone at time 63A. Subsequent sector pulses issue at times 63B as a result of counter 43 having been loaded successively from register 47.

The counter 44 is loaded by pulse 62 on line 40 with a fragmentary count held in register 46, which allows, in this example, two pulses to be generated at points 63B prior to index. Subsequent to index, the counter 44 is loaded from register 48 with a count which allows generation of an example eleven pulses per disk revolution at 63C. Signal 64 illustrates the terminal count condition signal from counter 44 and its effect of suppressing the sector pulse which would otherwise have occurred at time 65 in absence of the action of counter 44.

CALCULATION OF REGISTER VALUES IN FIRST EMBODIMENT

Register values in the first embodiment can be determined algebraically as shown below. The operators QUO and REM denote, respectively, quotient and remainder of a division operation. For example, QUO $\{9/5\}=1$, REM $\{9/5\}=4$; QUO $\{\frac{3}{4}\}=0$, REM $\{\frac{3}{4}\}=3$.
Define:
- APV=current APC value as read from APC counter.
- NST=number of sector pulses per track in the new zone
- NAPC=number of servo byte clocks per APC count
- NSBS=number of servo byte clocks per sector in the new zone Compute:
$Q=QUO\{(APV+1)*NAPC/NSBS\}$
$R=REM\{(APV+1)*NAPC/NSBS\}$ Load Registers:
- 2's complement $\{NSBS\}\rightarrow$Reg. 47 [#servo byte clocks per/sector register]
- 2's complement $\{NSBS-R\}\rightarrow$Reg. 45 [offset register]
- 2's complement $\{NST-Q+1\}\rightarrow$Reg. 46 [fragment register]
- 2's complement $\{NST+1\}\rightarrow$Reg. 48 [#sector pulses per track register]

Note that a lookup table indexed by both zone and APC value can also be utilized to determine the values to be set into registers 45, 46, 47 and 48. This approach is useful for formats employing a small number of zones, as the table rapidly increases in size as the number of zones is increased. Use of a table avoids requirements in the system microprocessor for multiply or divide operations.

Note finally the use of two's complement for all register loads. This is because the counters count up. Down counters could also have been used, in which case complementation would be unnecessary.

SECOND EMBODIMENT

In a second embodiment of the invention, an NST up-counter is provided with first and second backing registers; an SBC up-counter with single buffer register forms part of the invention, as does an orientation counter OC and accompanying digital equality comparator EC with input latches. No APC counter is used, since the OC counter performs a similar function. The OC counter is reset periodically to zero count at index point.

The OC and SBC counters are clocked by servo byte clock. As in the first embodiment, the NST counter is clocked by overflow of the SBC counter.

When a zone change is to be made, microcode interrogates the OC counter. The result of this interrogation is a measure of the current angular position of the disk. From this information, microcode determines a number to be loaded into EC. This number corresponds to a count in OC which corresponds to the distance from the last index point to an upcoming sector pulse in the new zone. Microcode also loads the first and second NST counter backing registers, respectively, with a count of the number of sector pulses remaining between the upcoming sector pulse and next index, and a quantity representative of the number of sector pulses per track in the new zone. Microcode further loads the SBC buffer register with a count of the number of servo byte clock cycles per sector in the new zone. Microcode thereupon pulses a hardware line to initialize the zone changeover sequence.

When EC determines that a match has occurred between its count and that of counter OC, it causes a single sector pulse to be generated, initiates loading of counter SBC from its buffer register, and causes the first NST backing register to be strobed into the NST counter.

Thereafter, until new zone change occurs, overflow of the SBC counter or occurrence of index causes reloading of SBC from its buffer register, until issuance of a sector pulse.

At index point and thereafter when a new zone change is commanded, the NST counter is reloaded from its second backing register. As in the first embodiment and the prior art, overflow of the NST counter suppresses issuance of further sector pulses until occurrence of index.

DESCRIPTION OF SECOND EMBODIMENT

Figure 4:
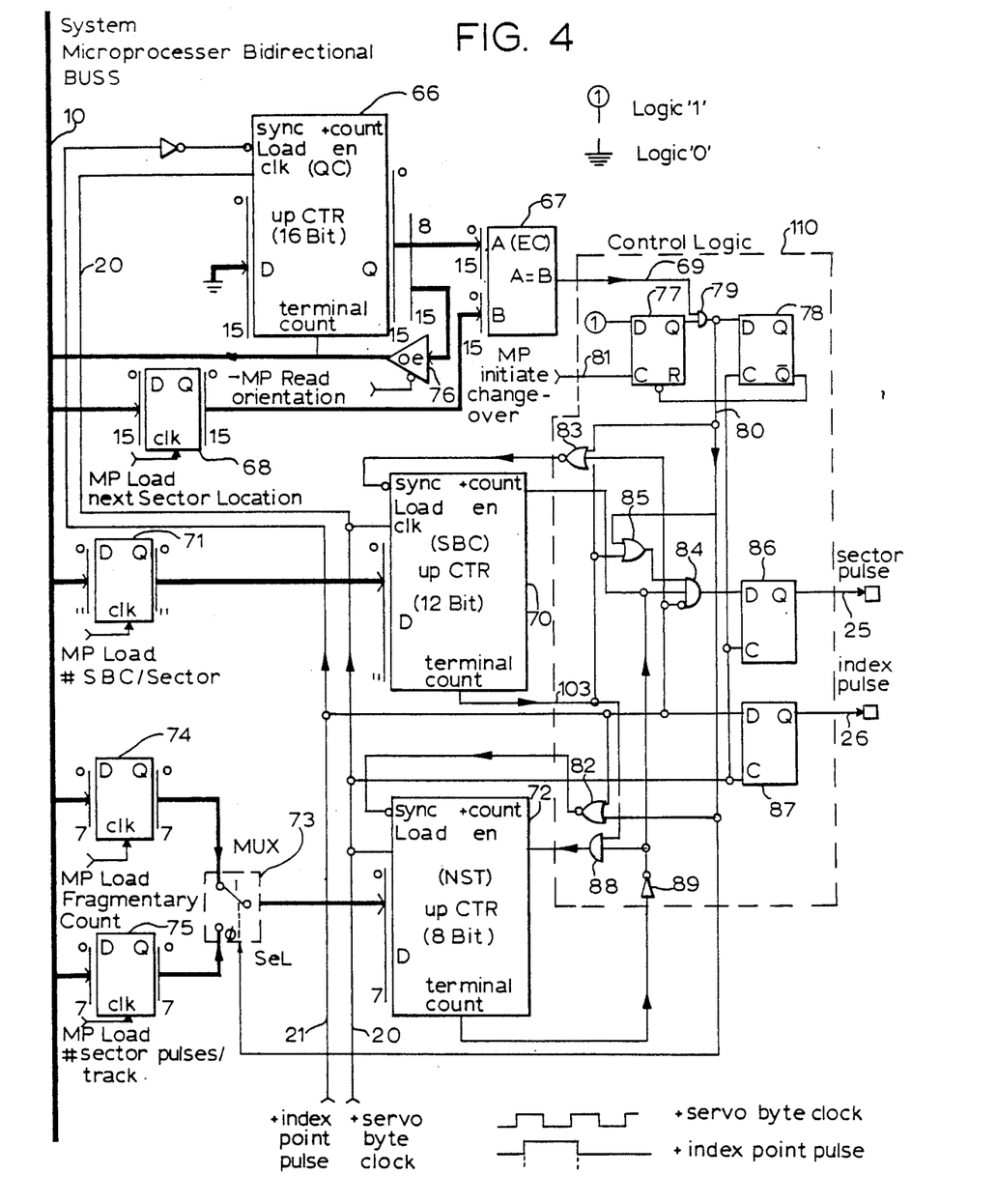
FIG. 4 is a block diagram showing the second embodiment of the present invention.

A second embodiment of the present invention is illustrated in FIG. 4. As was the case with the circuit of FIG. 2, the circuit of FIG. 4 is coupled to a microprocessor (not shown) through a microprocessor system bus 10. Index point pulse 21 and servo byte clock 20 are provided by a servo phaselock oscillator, which is part of the disk drive servo system (not shown).

The index point pulse 21 is inverted and coupled to the synchronous load clock input of OC counter 66. The counter 66 is clocked by servo byte clock 20. The counter 66 is a 16-bit counter in the preferred embodiment of the present invention. The counter is reset by the index pulse 21 and counts up at the servo byte clock rate until recurrence of index, when it is again reset to zero. The output of counter 66 is provided to the A input of EC comparator 67. A tri-state gate coupled to the output of counter 66 provides means for the microprocessor to read the count contained in counter 66. The output of tri-state gate 76 is coupled to the system bus 10. Latch 68 is coupled to bus 10 and contains a number which defines the count corresponding to the location relative to last index of the first sector pulse in a target zone subsequent to a zone change.

The output of latch 68 is coupled to the B input of 16-bit equality comparator 67. Comparator 67 thus compares the output of counter 66 with the value stored in latch 68. The output of comparator 67 is coupled to control logic 101. When the A and B inputs of comparator 67 are equal, a pulse is provided on an output 69 of comparator 67. When a zone change is to occur, the microprocessor loads a count of the number of servo byte clocks per sector into register 71. The output of register 71 is applied to the D input of SBC counter 70. In the preferred embodiment of the present invention, counter 70 is a 12-bit counter. Counter 70 is clocked by servo byte clock 20. The count enable terminal of counter 70 is coupled to inverter 89, which inverts the terminal count signal generated by NST counter 72. The terminal count output 103 of counter 70 is coupled to an input of OR gate 55, NOR gate 83 and NOR gate 82.

NST counter 72 can be loaded from register 74 or 75 through multiplexer 73. Prior to commanding a zone change, the microprocessor will load a fragmentary count into register 74 representing the number of sectors remaining between the point of zone change and index. Register 75 will be loaded with the number of sector pulses per track. These load operations occur through system bus 10. The outputs of register 74 and 75 are coupled through multiplexer 73 to the input of counter 72. Counter 72 is incremented by overflow of counter 70. When counter 72 overflows, its terminal count suppresses counting in counter 70 and blocks further issuance of sector pulses until index occurs. As in the previous embodiment, this process ensures that no shortened sectors will be generated. The terminal count output of counter 72 is inverted at inverter 89 and coupled to node 102 and as an input to AND gate 88. The output of AND gate 88 is coupled to the count enable terminal of counter 72.

Flipflops 77 and 78 form a circuit to govern zone transition sequencing in the sector counter of this embodiment of the present invention. The Q output of flipflop 77 is coupled to AND gate 79, to which is also applied output 69 of comparator 67. The clock input of flipflop 77 is controlled by the microprocessor, which pulses it high after registers 68, 71, 74 and 75 have been loaded appropriately and a zone change is to commence. When the flipflop 77 has been set by a pulse on line 81, an equality compare between the contents of counter 66 and those of register 68 causes a single pulse to issue on line 80. Line 80 is the output of AND gate 79.

This output 80 is also coupled to the D input of flipflop 78. The inverted Q output of flipflop 78 is coupled to the reset input of flipflop 77. The output 80 of AND gate 79 is coupled as an input to NOR gate 83, NOR gate 82 and controls multiplexer 73. The output of NOR gate 83 is coupled to the synchronous load input of SBC counter 70. The output of NOR gate 82 is coupled to the synchronous load input of NST counter 72. The NOR gate 82 controls the parallel loading of counter 72 from its D inputs. Loading of NST counter 72 from buffer register 75 occurs at index point; loading of counter 72 from buffer register 74 occurs when line 80 pulses high during a zone change.

Flipflop 77 is automatically reset through action of flipflop 78 and no further pulses appear on line 80 until a new zone change is commenced.

NOR gate 83 controls parallel loading of SBC counter 70 so that the counter is loaded at zone change (when line 80 pulses) or when counter 70 arrives at terminal count (sector count) or at index. The terminal count output of counter 72 is supplied to the count enable terminal of counter 70 in order to suppress further counting after the correct number of sector pulses has been generated on a given rotation. Terminal count of counter 72 is also applied to AND gate 84 to suppress further sector pulses until after the next index time. OR gate 85 provides for sector pulse generation whenever line 80 pulses, or counter 70 develops terminal count.

Flipflops 86 and 87 resynchronize sector and index pulses 25 and 26, respectively, prior to their application to the system data controller.

ZONE CHANGE FIG. 4

Figure 5:
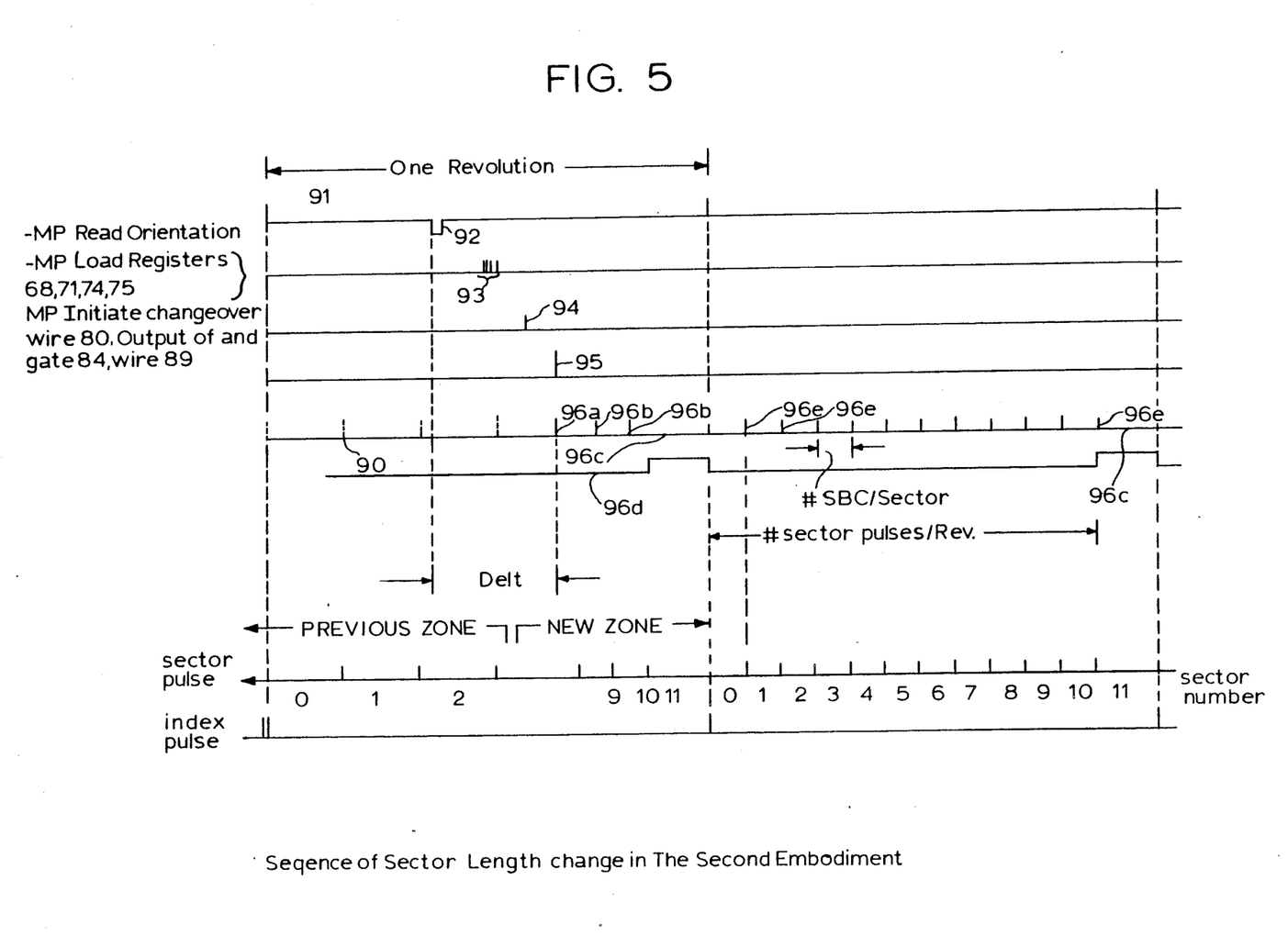
FIG. 5 illustrates the sequencing of a sector-length change in the second embodiment of the present invention.

The waveforms of the circuit of FIG. 4 are illustrated in FIG. 5. FIGS. 4 and 5 are referred to during the following description of the zone change sequence in the embodiment of FIG. 4.

Index point is denoted by 91 in FIG. 5. Sector pulses in the previous zone, prior to zone change, are generated by terminal count of block 70, as shown at 90. When a zone change is to be made, the microprocessor reads the state of counter 66 (at time 92). Using the orientation information thus obtained, it loads registers 68, 71, 74 and 75 with appropriate counts. In similar fashion to the embodiment of FIG. 2, the number of servo byte clocks/sector count for a sector in the new zone is set by microcode into register 71. Also, the fragmentary count of number of sector pulses remaining between the zone change point and index is set in register 74; register 75 is loaded with a number related to the number of sector pulses per track in the new zone.

Register 68 is loaded with a number corresponding to the absolute position (in servo byte clock counts relative to index) on the track of the first sector mark to be issued under the new zone. In order to allow sufficient computation time in the microprocessor, the sector mark chosen to issue first in the new zone will lie somewhat ahead of the orientation information read at point 92. This displacement is labeled 'DELT' in FIG. 5, and is a microcoded constant chosen on the basis of computation time required to calculate the necessary register values. The microprocessor initiates the zone changes by pulsing line 81, shown at 94 in FIG. 5.

When register 68 and counter 66 compare equal, circuit 77, 78 and 79 will now generate a single pulse on line 80 at point 95. This generates a first sector pulse at 96A of the new zone, causes counter 70 to be loaded from its backup register 71, and causes counter 72 to be loaded from fragmentary count register 74. Prior to index, additional sector pulses at the new zone rate are generated at 96(b). Points 96(c) illustrate points where issuance of a sector pulse is suppressed because of overflow of NST counter 72, shown at waveform 96(d). This suppression continues until an index pulse intervenes, or a zone change is ordered.

Thereafter, counter 70 is loaded from register 71 wherever counter 70 develops a terminal count condition. Counter 72 is loaded from register 75 at all subsequent index points, until a new zone change sequence is performed. Sector pulses shown at 96(e) are generated until another zone change occurs.

Register values appropriate to the second embodiment of this invention may be calculated by following reasoning parallel to that adopted for register value calculation in the first embodiment.

An example of the synchronous n-stage up-counter used in the present invention is illustrated in FIG. 7. A plurality of D flipflops 104(0)–104(n) provide outputs $Q_0$–$Q_n$, respectively. The flipflops are clocked by clock 20, and respond to the rising edge of this signal. The D inputs of flipflops 104(0)–104(n) are provided by multiplexers 105(0)–105(n). One input terminal of multiplexers 105(0)–105(n) is provided by inputs $D_0$–$D_n$, respectively. The other terminal of multiplexers 105(0)–105(n) is provided by the output of combinational logic acting on count enable signal 108 and the Q outputs of flipflops 104(0)–104(n). This logic allows the counter to be loaded synchronously from its D inputs $D_0$–$D_n$.

For example, the $Q_0$ output of flipflop 104(0) is provided as one input to exclusive OR gate 106(0). The other input of exclusive OR gate 106(0) is the count enable signal 108. The output of exclusive OR gate 106(0) is provided as an input to multiplexer 105(0). The multiplexers are controlled by negative true synchronous load signal 21.

For each successive flipflop, one terminal of exclusive OR gates 106(1)–106($n$) is the output of AND gates 107(1)–107($n$). The AND gates combines all preceding Q outputs and the count enable signal 108, to provide a local carry signal. A specific stage is thus allowed to toggle when all preceding stages are in the "1" state, and the +count enable terminal is asserted. AND gate 109$a$ provides a terminal count (carry) output 109 for the entire counter block.

Thus, a zone density sector counter has been described.

We claim:

1. A circuit for providing a valid sector count in a storage system having a plurality of recording zones comprising:
   first counting means for providing a reference count signal;
   first storage means for storing an offset value representing angular displacement between said reference count signal and a next consecutive sector of a target recording zone;
   second counting means coupled to said first counting means and said first storage means for providing a sector count output signal after occurrence of said angular displacement.

2. The circuit of claim 1 further including;
   second storage means coupled to said second counter for storing a sector length for each zone;
   said sector counter providing said sector count output signal after occurrence of said sector length.

3. The circuit of claim 2 further including a switch means coupled to said second counting means and to said first and second storage means for switching said second counting means from said first to said second storage means when an index signal is detected.

4. A method for providing a valid sector count in a storage system having a plurality of recording zones, said method comprising the steps of:
   providing a reference count signal representative of sectors in a first reference zone;
   storing an offset value between each sector count and each next consecutive sector count in said plurality of zones;
   generating a sector count output for one of said zones based on said offset value.

5. The method of claim 4 having the additional steps of:
   storing a sector length for each zone in a second storage means;
   generating said sector count output based on said sector length when an index signal is detected in one of said zones.

6. A circuit for providing sector identification pulses in a storage system having a plurality of tracks formed on the surface of a storage medium, said tracks being divided into a plurality of recording zones, said circuit comprising:
   a first counting means coupled to first and second clocking signals, said first counting means for providing a reference count signal;
   first storage means for storing an offset value representing a time difference between said reference count signal and a next consecutive sector of a target recording zone;
   second storage means for storing a sector length for said target zone;
   switch means selectively coupled to said first and second storage means;
   second counting means coupled to said switch means, said second counting means coupled to said first storage means when said target zone is initially accessed, said second counting means further coupled to said first clock signal, said second counting means for providing a sector count output signal after occurrence of said time difference;
   control means coupled to said switch means for coupling said switch means to said second storage means when an index signal has been detected in said target zone.

7. The circuit of claim 6 wherein said first clock signal comprises a byte clock.

8. The circuit of claim 7 wherein said second clock signal comprises an index signal.

9. The circuit of claim 8 further including a first latch means coupled to said first storage means and said switch, said first latch means for storing said offset value.

10. The circuit of claim 9 further including a second latch means coupled to said second storage means and said switch, said second latch means for storing said sector length.

11. The circuit of claim 10 wherein said first counting means comprises a rotational position-sensing (APC) counter.

12. A method for providing a sector count in a storage system having a plurality of tracks, said tracks arranged in a plurality of recording zones, one of said zones being a reference zone, said method comprising the steps of;
   providing a reference count signal representative of sectors formed in said reference zone;
   loading an offset value into a first latch means when moving from one zone to a target zone, said offset value representing a time difference between said reference count and a next consecutive sector of said target zone;
   using said offset value to generate a zone sector pulse output signal until an index is detected in said target zone;
   storing a sector length value in a second latch, said sector length representative of the sector length of said target zone;
   using said sector length to generate said zone sector pulse output signal after detection of index in said target zone.

13. A circuit for providing a valid sector count in a storage system having a plurality of recording zones comprising:
   first counting means for providing a reference count signal;
   comparing means coupled to said reference clock signal and an offset count signal, said comparing means providing a first output to a logic sequence means;
   second counting means coupled to said logic sequence means for counting the number of servo byte clocks per sector of a current recording zone, said second counting means providing a sector count output signal after occurrence of said angular displacement.

14. The circuit of claim 13 further including third counting means coupled to said logic circuit, said third counting means selectively enabled to provide a number of sectors per track of one of said recording zones and a distance between a sector end point and an occurrence of index.

* * * * *